United States Patent [19]

Reh et al.

[11] 4,310,501

[45] Jan. 12, 1982

[54] PROCESS FOR PRODUCING HYDROGEN FLUORIDE

[75] Inventors: Lothar Reh; Hans W. Schmidt; Harald Sauer, all of Frankfurt am Main; Günter Winkhaus, Königswinter; Roland Thome, Bonn; Dieter Moritz, Lünen, all of Fed. Rep. of Germany

[73] Assignees: Metallgesellschaft A.G., Frankfurt am Main; Vereinigte Aluminium Werke A.G., Bonn, both of Fed. Rep. of Germany

[21] Appl. No.: 166,917

[22] Filed: Jul. 9, 1980

[30] Foreign Application Priority Data

Jul. 13, 1979 [DE] Fed. Rep. of Germany ....... 2928368

[51] Int. Cl.³ ............................................... C01B 7/19
[52] U.S. Cl. ................................. 423/484; 423/111; 423/240; 423/485
[58] Field of Search ............... 423/111, 240, 383, 484, 423/485; 55/71, 80

[56] References Cited

U.S. PATENT DOCUMENTS

| 3,565,408 | 2/1971 | Reh et al. | 423/111 |
| 3,981,355 | 9/1976 | Squires | 55/80 |
| 4,006,066 | 2/1977 | Sparwald | 423/484 |
| 4,065,551 | 12/1977 | Dahl | 423/483 |
| 4,113,832 | 9/1978 | Bell | 423/119 |
| 4,160,808 | 7/1979 | Anderson | 423/119 |
| 4,160,809 | 7/1979 | Anderson et al. | 423/119 |

FOREIGN PATENT DOCUMENTS

| 2346537 | 4/1975 | Fed. Rep. of Germany . |
| 2403282 | 11/1975 | Fed. Rep. of Germany . |
| 1904381 | 9/1979 | Fed. Rep. of Germany . |
| 2009684 | 3/1974 | France . |
| 109385 | 7/1966 | Norway . |
| 1479924 | 7/1977 | United Kingdom . |

Primary Examiner—Earl C. Thomas
Attorney, Agent, or Firm—Karl F. Ross

[57] ABSTRACT

A method of recovering fluorine, e.g. as hydrogen fluoride, from wastes of aluminum electrolysis furnaces, chemisorbents, adsorbents or absorbents, etc. in which the fluorine-containing material is subjected to pyrohydrolysis in an expanded fluid bed and the HF-containing gas is subjected to condensation or scrubbing for the removal of the HF therefrom. According to the invention, the exhaust gases from the fluidized bed are cooled by direct contact with solids which can be circulated in a separate cycle and are themselves cooled in a cooler, e.g. by contact with gas which is to be fed to the expanded fluidized bed. The circulated solids thus allow recovery of the sensible heat of the gas without diluting it.

3 Claims, 1 Drawing Figure

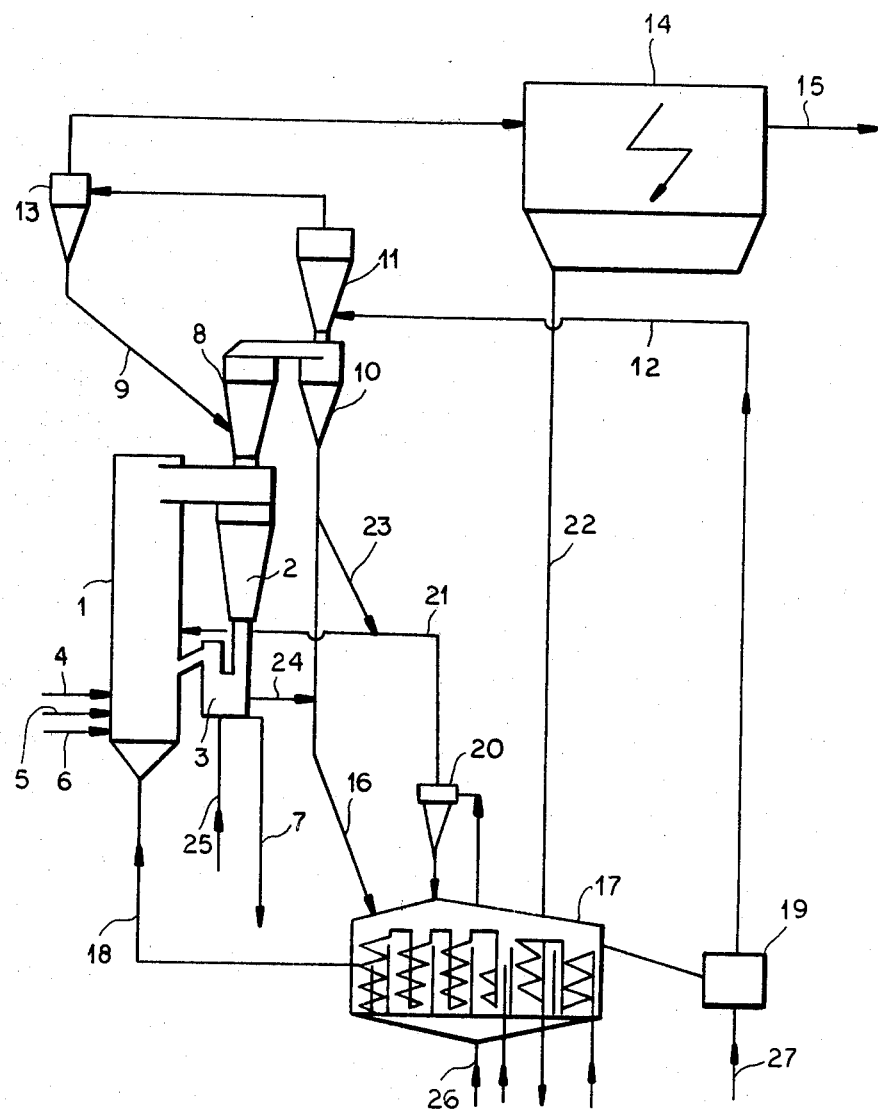

PROCESS FOR PRODUCING HYDROGEN FLUORIDE

FIELD OF THE INVENTION

Our present invention relates to the production of hydrogen fluoride and to the recovery of fluorine in the form of hydrogen fluoride from fluorine-containing mineral and like materials, especially waste materials from electrolytic aluminum furnaces and materials which have been used to absorb or adsorb fluorine compounds from gases as part of a gas treatment. More particularly, the invention relates to a method of producing HF which eliminates dilution of the gas from which the HF is to be ultimately recovered.

BACKGROUND OF THE INVENTION

The problem of recovery of fluorine from mineral or other wastes of metallurgical processes, e.g. electrolytic refining of aluminum, is one which arises because of economic considerations and environmental or social considerations and hence has been the subject of considerable investigation. Fluorine-containing compounds are present in waste materials from such furnaces and these materials can include walls, linings and the like. Such materials also arise, as described below, from the removal of fluorine-containing compounds from waste gases of metallurgical and other processes utilizing absorption and adsorption techniques.

It is known that fluorine-containing compounds release hydrogen fluoride in the presence of water vapor at elevated temperature (pyrohydrolysis) and that the released hydrogen fluoride can be recovered in a higher concentration by a condensing or scrubbing step.

The pyrohydrolytic release of hydrogen fluoride has become significant particularly in the processing of waste materials which become available at various stages in the electrolytic production of aluminum. For instance, in the production of aluminum by fused-salt electrolysis, in which cryolite or similar fluorine-containing fluxes are usually employed, fluorine-containing constituents enter the lining of the electrolytic cell. This lining must be renewed from time to time and the old lining material which has been broken out is then available and may contain 10 to 15% by weight of fluorine, depending on the mode of operation of the cell and on the time for which the lining has been in operation.

Another fluorine-containing material will be obtained when hydrogen fluoride is removed from exhaust gases from fused-salt electrolysis by dry scrubbing. Where alumina is used as a sorbent, a chemisorption agent will become available, which is laden with hydrogen fluoride in dependence on the scrubbing conditions and must be processed because it cannot be fed to the fused-salt electrolysis as it contains other impurities formerly contained in the exhaust gases, such as carbon, sulfur, iron, silicon, phosphorus and/or vanadium.

It has been found that such waste materials can be processed by pyrohydrolysis (Opened German Specification Nos. 2,346,537 and 2,403,282), which may be combined with the recovery of additional valuable substances, such as aluminum or alkali metal (U.S. Pat. No. 4,113,832). In the last-mentioned process, the pyrohydrolytic treatment is carried out within a temperature range of about 1110° to 1350° C., e.g. in an expanded fluidized bed, in the presence of adequate quantities of water vapor. Alkali fluoride and hydrogen fluoride are removed from the exhaust gas. The solid residue from the pyrohydrolytic treatment is leached with an alkaline solution, and hydrated alumina is formed. Before the alkali fluoride and the hydrogen fluoride are removed from the gas, the latter is cooled by being sprayed with water or by being mixed with cold gas or by an indirect cooling.

A disadvantage of this process is that the sensible heat of the exhaust gas is wasted and the gas rate is considerably increased when the exhaust gas is cooled by a spraying of water. Similar remarks apply to the cooling by an admixing of cold gas, which involves particularly an undesired dilution of the gas, which apart from this contains only a small percentage of hydrogen fluoride. Whereas these disadvantages can be avoided by indirect cooling, this can be controlled only with difficulty because problems of corrosion and erosion arise and because the deposition of dust on the cooling surfaces decreases the coefficient of heat transfer so that a high structural expenditure is involved (for cleaning) and/or large exchange surfaces are required.

OBJECTS OF THE INVENTION

It is, therefore, the principal object of the present invention to provide a process for producing hydrogen fluoride in which the disadvantages of earlier techniques are avoided and the energy utilization is maximized.

Another object of the invention is to provide an improved method of recovering fluorine-containing materials at low cost and with little likelihood of corrosion damage or erosion damage to the recovery apparatus.

Still another object of our invention is to provide an improved method of operating a plant for production of hydrogen fluoride or for the recovery of fluorine as hydrogen fluoride from fluorine-containing material.

SUMMARY OF THE INVENTION

These objects and others which will become apparent hereinafter are attained in accordance with the present invention in a method of recovering fluorine as hydrogen fluoride from fluorine-containing materials and materials which contain fluorine compounds by subjecting these materials to pyrohydrolysis at a temperature in a range of 1000° to 1400° C. in an expanded fluidized bed, thereby producing a hot exhaust gas containing HF and with which particles of the bed material are entrained out of the pyrohydrolysis reactor, separating the hot gas containing the HF from the entrained solids, cooling the hot gas after the separation or during the separation by direct contact of the gas with particles of solids at a lower temperature and cooling the particles of solids thus heated by circulating same in a cooling cycle which includes a cooler. Thus, instead of diluting the HF-containing gas for cooling or using indirect heat exchange which raises a corrosion problem, direct cooling with circulated solids is used in accordance with the invention.

Thus the objects of the invention are attained in that the exhaust gases are cooled by a direct contact with solids which are circulated in a separate cycle and which are recooled in a cooler with utilization of the sensible heat.

The process according to the invention can be used to process waste materials which become available in the electrolytic production of aluminum. Fluorspar ($CaF_2$) or other fluorine-containing inorganic materials from which hydrogen fluoride can be released by pyrohydrolysis can be treated too.

Depending on the nature of the feedstock, a fuel must be used for heating to the required reaction temperatures, which lie between about 1000° and 1400° C., as usual. Liquid, gaseous but also solid fuels may be used for this purpose and are directly introduced into the expanded fluidized bed. If the feedstock has a sufficiently high carbon content, as will usually be the case with broken-out lining material, there will be no need for separate addition of fuel.

The most suitable and most simple method of cooling the exhaust gas comprises contacting the exhaust gas with recooled solid in at least one suspension-type heat exchanger.

The solids are preferably recooled in a fluidized bed cooler, which may comprise a plurality of stages. Its mode of operation and design will mainly depend on the nature of the feedstock. If the same has a fuel content which is so high that the temperature conditions required in the expanded fluidized bed can be achieved, the solid can be recooled with utilization of the sensible heat, e.g. with generation of water vapor. The resulting hot exhaust gas is desirably recycled into the fluidized bed reactor. If it is essential to add fuel separately or if the pyrohydrolitic process is just self-sustaining, then it will be desirable to recool the solids in a fluidized bed cooler having a plurality of cooling chambers, which are traversed in succession and in which oxygen-containing gas is heated and subsequently fed to the fluidized reactor, particularly as a fluidizing gas.

In both embodiments, the fluidized bed cooler may be succeeded by a cooling chamber, which is supplied with cold water and in which additional heat is extracted from the solids. That cooling chamber may form a structural unit with the fluidized bed cooler or may be separate from the latter. In the latter case the exhaust gases from the cooling chamber may be used for other purposes.

The expanded fluidized bed used in accordance with the invention differs from an "orthodox" fluidized bed, in which a dense phase is separated by a sudden change in density from the overlying gas space, by having a density distribution with no defined phase interface. There is no sudden change in density between a dense phase and the overlying gas space but the solids concentration in the reactor decreases gradually from bottom to top.

In a particularly advantageous technique, the oxygen-containing gas required for the combustion is supplied to the fluidized bed in two streams on different levels and the solids which have been entrained by the exhaust gas and separated from the latter are recycled to the lower portion of the fluidized bed. This mode of operation will result in a weak combustion in two stages so that hot spots and a formation of $NO_x$ (nitrogen oxide) gases are precluded and the recirculation of the solids separated from the exhaust gases will result in a highly constant temperature in the system consisting of the fluidized bed reactor, the separator and the return duct.

Virtually any gas which will not adversely affect the nature of the exhaust gas may be used as a fluidizing gas. Suitable gases include inert gas, such as recycled flue gas (exhaust gas), nitrogen and steam. In order to intensify the combustion it will be desirable to feed part of the required oxygen-containing gases to the fluidized bed reactor as fluidizing gas.

It is apparent that the invention may be carried out in the following modes:

1. Inert gas is used as a fluidizing gas. In that case the oxygen-containing combustion gas must be fed as secondary gas on at least two levels.

2. Oxygen-containing gas is used as fluidizing gas. In that case, secondary gas may be fed on only one level although the secondary gas may also be fed in a plurality of levels.

A plurality of inlets for the secondary gas are advantageously provided on each level. The volume ratio of fluidizing gas to secondary gas should be in the range of 1:20 to 2:1.

The secondary gas is suitably fed to the fluidized bed reactor on a level which is spaced by up to 30% of the height of the fluidized bed reactor and by at least 1 m over the level on which the fluidizing gas enters the reactor. If the secondary gas is fed on a plurality of levels, the limit of 30% will be applicable to the level of the uppermost secondary gas inlet. That level ensures that there will be an adequate space for the first combustion stage so that there will be an almost complete reaction between the combustible constituents and the oxygen-containing gas, whether it consists of the fluidizing gas or of a secondary gas fed on a lower level. On the other hand, a zone which is sufficiently large for a complete combustion will be provided in the upper reaction space above the secondary gas inlet means.

The gas velocities in the fluidized bed reactor above the secondary gas inlet means are usually higher than 5 m/sec. and may be as high as 15 m/sec.

The ratio of the diameter to the height of the fluidized bed reactor should be selected so that gas residence times of 0.5 to 8.0 seconds, preferably 1 to 4 seconds, are obtained.

The feedstock should have an average particle diameter of 30 to 250 micrometers. This will ensure good fluidizing conditions as well as sufficiently short reaction times.

The mean density of the suspension to be maintained in the fluidized bed may be varied within wide limits and may be as high as 100 kg/m³. In order to minimize the pressure loss, a mean density of the suspension in the range from 10 to 40 kg/m³ should be maintained above the secondary gas inlet means.

If the Froude and Archimedes numbers are used to define the operating conditions, the following ranges will then be obtained:

$$0.1 \leq \frac{3}{4} \cdot F_r^2 \cdot \frac{\rho_g}{\rho_k - \rho_g} \leq 10$$

$$\text{and } 0.01 \leq Ar \leq 100$$

$$\text{wherein } Ar = \frac{d_k^3 \cdot g(\rho_k - \rho_g)}{\rho_g \cdot \nu^2} \text{ and}$$

$$F_r^2 = \frac{u^2}{g \cdot d_k}$$

In the above expressions,
$F_r$ Froude number;
Ar Archimedes number;
u relative gas velocity in m/sec;
$\rho g$ density of gas in kg/m³;
$\rho k$ density of solid particle in kg/m³;
$d_k$ diameter of spherical particle in m;
$\nu$ kinematic viscosity in m²/sec.;
g acceleration due to gravity in m/sec.².

The feedstock is fed into the fluidized bed reactor in the usual manner, most suitably through one or more lances, e.g. by pneumatic blowing. Owing to the good transverse mixing, a relatively small number of feed lances and in small fluidized bed reactors even a single lance will be sufficient.

The eminent advantage afforded by the invention resides in that the use of recooled solids results in a shock-like cooling of the exhaust gases so that corrosion is substantially avoided, and that dust deposits which would adversely affect the heat transfer obviously cannot be formed. In the preferred embodiment using a fluidized bed cooler, the solids are recooled under conditions which permit a high heat transfer to the cooling fluid.

Because the cooling solids are handled in a cycle which is separate from the solids which are subjected to pyrohydrolysis, said cooling solids will not be laden with HF, except for the starting period, and no HF will be lost in the recooling step. Besides, the exhaust gas is cooled in such a manner that a dilution of the exhaust gas will be precluded or will be minimized if the cooling by solids is supplemented by an addition of water at a low rate, e.g., in a stage which succeeds the addition of the recooled solids.

BRIEF DESCRIPTION OF THE DRAWING

The above and other objects, features and advantages of the present invention will become more rapidly apparent from the following description, reference being made to the accompanying drawing in which the sole FIGURE is a flow diagram illustrating a plant for carrying out the process of the present invention.

SPECIFIC DESCRIPTION

Feedstock as well as water, possibly in the form of steam, and fuel, if required, are fed through lances 4, 5 and 6 to a cycle which consists of a fluidized bed reactor 1, a cyclone separator 2 and a return conduit 3. After a sufficiently long residence time, a pyrohydrolyzed residue derived from the feedstock is withdrawn via duct 7 and is discarded or may be leached for a recovery of valuable substances.

The exhaust gas from the fluidized bed reactor 1 enters the suspension-type heat exchanger 8, in which it is subjected to a first cooling step by being contacted with circulated solids, which are fed via duct 9. The gas and solids are separated in a succeeding separator 10. The gas enters a second suspension-type heat exchanger 11, which is fed with recooled solids via a pneumatic conveyor 12. When the gas has thus been cooled further, it is separated from the solids in another separator 13. Dust is then collected from the HF-containing gas in an electrostatic precipitator 14, from which the gas is delivered in duct 15 to an absorbing -or a condensing unit, not shown.

The solids collected in the separator 10 are fed via duct 16 to the fluidized bed cooler 17, in which they first flow through four cooling chambers. In said chambers, the solids deliver a substantial part of their heat content by indirect heat exchange to oxygen-containing gases, which flow countercurrently to the solids and are free from dust as they are subsequently fed via duct 18 as fluidizing gas to the fluidized bed reactor 1. The solids are then finally cooled in two succeeding cooling chambers, which are cooled, e.g. with water, and from which the solids are fed to the pneumatic conveyor 19.

The oxygen-containing fluidizing gas extracts a substantial amount of additional heat from the solids in the fluidizing bed cooler 17 and is then passed through the separator 20 for dust collection. From the separator 20, the gas is fed to the fluidized bed reactor 1 via duct 21 as secondary gas. The dust collected in the electrostatic precipitator 14 is recycled to the fluidized bed cooler 17 in duct 22.

When solids have become enriched or depleted in the cycle consisting of the fluidized bed cooler 17, duct 12, suspension-type heat exchanger 11, separator 13, suspension-type heat exchanger 8, separator 10 and conduit 16, solids are transferred from said cycle via duct 23 to the circulated fluidized bed or may be fed via duct 24 to the cycle which includes the cooler 17.

Ducts 25, 26 and 27 serve to supply fluidizing or conveying gases.

SPECIFIC EXAMPLES

Example 1

The feedstock consisted of dry lining material which had been broken out from an electrolytic cell used for fused-salt electrolysis in the production of aluminum and had been ground to an average particle size of 100 to 200 micrometers. The feedstock had a bulk density of 1.1 kg/l and contained 26% by weight of carbon and
15% by weight of fluorine (calculated as F).

Owing to the high carbon content, the pyrohydrolysis was self-sustaining, i.e., there was no need for additional fuel. The gas quantities which will be stated hereinafter are based on standard conditions.

The broken-out lining material was fed to the fluidized bed reactor 1 via duct 4 at a rate of 5000 kg/h together with water at 20° fed via conduit 6 at a rate of 3.1 m$^3$/h. At the same time, the reactor 1 was fed via duct 18 with fluidizing air at 300° C. at a rate of 3000 m$^3$/h and via duct 21 with secondary air at 400° C. at a rate of 9500 m$^3$/h. The fluidizing air and secondary air had previously been preheated in the fluidized bed cooler 17. As a result of the selected fluidizing conditions and operating parameters, the solids were circulated in the cycle consisting of the fluidized bed reactor 1, cyclone separator 2 and recycling duct 3 in such a manner that the suspension in the fluidized bed reactor 1 had a mean density of about 100 kg/m$^3$ below the secondary gas duct 21 and about 20 kg/m$^3$ above the secondary gas duct 21. To ensure a satisfactory recycling of solids into the fluidized bed reactor 1, the solids in the recycling duct 3 were fluidized with air at a rate of 200 m$^3$/h. The temperature in the cycle was about 1100° C.

After a residence time of 1 hour, treated residue was withdrawn via duct 7 at a rate of 3000 kg/h, equivalent to the feed rate, and was cooled in a separate cooler. The treated residue had a bulk density of 1 kg/l. Its residual contents of fluorine and carbon were below 1% by weight and 0.1% by weight, respectively.

The exhaust gas from the fluidized bed reactor 1 was cooled with solids that had become available in the process itself. For this purpose, the exhaust gas leaving the cyclone separator 2 at 1100° C. was cooled to 590° C. in the suspension-type heat exchanger 8 by means of solids at 280° C., which were fed via duct 9 at a rate of 50,000 kg/h and were thus heated to 590° C. The solids were then fed from separator 10 via duct 16 to the fluidized bed cooler 17.

In the second suspension-type heat exchanger 11 in the gas-flow path, the exhaust gas from the separator 10 was contacted with solids at 80° C., which had been pneumatically conveyed via duct 12 from the fluidized bed cooler 17 at a rate of 50,000 kg/h. Gas and solids were then separated in the separator 13, in which solids at 280° C. became available. The gas that became available at a rate of 19,500 m³/h in the separator 13 at 280° C. was fed to the electrostatic precipitator 14 and from the latter to the plant for recovering hydrogen fluoride. The exhaust gas had the following composition in % by volume:

| | |
|---|---|
| $CO_2$ | 12.8 |
| $O_2$ | 3.3 |
| HF | 4.4 |
| $N_2$ | 61.5 |
| $H_2O$ | 17.8 |

Solids from the separator 10 were fed at a rate of 50,000 kg/h via duct 16 to the fluidized bed cooler 17 and were cooled therein in four cooling chambers by a heat exchange with air for the fluidized bed reactor 1 and in two cooling chambers supplied with water. The fluidized bed cooler 17 was supplied with fluidizing air at a rate of 9500 m³/h and air at a rate of 3000 m³/h was supplied for an indirect heat exchange. The two air streams were withdrawn via ducts 21 and 18, respectively.

The water-cooled chambers of the fluidized bed cooler 17 were supplied with water at a rate of 95 m³/h. In said chambers the cooling water was heated from 40° to 90° C. whereas the solids were cooled to 80° C. The cooled solids were recycled to the suspension-type heat exchanger 11 with the aid of conveying air, which was at 60° C. and a pressure of 500 mbars above atmospheric pressure and was supplied via duct 27 at a rate of 2500 m³/h.

Example 2

Hydrogen fluoride was recovered from fluorspar which had an average particle size of 100 to 200 micrometers, a density of 1.2 kg/l and a calcium fluoride content of about 95% by weight. Different from Example 1, additional fuel was required in this case.

The fluidized bed reactor 1 was supplied via conduits 6, 4 and 5, respectively, with
1210 kg/h coal (29,260 kJ/kg)
1540 kg/h fluorspar (calculated as $CaF_2$)
3100 l/h water at 20° C.

The reactor 1 was supplied with fluidizing air at 400° C. at a rate of 3000 m³/h via duct 18 and with secondary air at 550° C. at a rate of 7000 m³/h via duct 21. Both air streams came from the fluidized bed cooler 17.

In the fluidized bed reactor 1, the suspension had a mean density of 100 kg/m³ below the secondary gas duct 21 and of 25 kg/m³ above the secondary gas duct 21. The reactor was operated at 1120° C. As in Example 1, a satisfactory recycling of solids into the fluidized bed reactor 1 was ensured by a supply of air at a rate of 200 m³/h into the recycling duct 3. A residence time of 90 minutes was maintained.

Treated residue at a rate of 1230 kg/h, equivalent to the feed rate, was withdrawn from the cycle via duct 7. The residue had the quality of burnt lime and could be used in the building industry.

By contrast with Example 1, the exhaust gas was cooled with extraneous solids consisting of alumina. The gas and solids were conducted along the same paths as in Example 1.

Solids at a rate of 40,000 kg/h were circulated through the conveyor duct 12, the suspension-type heat exchanger and separator and the fluidized bed cooler 17. Conveying air at 60° C. was supplied at a rate of 2100 m³/h and a pressure of 500 mbars above atmospheric pressure. The exhaust gas and solids temperatures obtained in the suspension-type heat exchanger and separator stages amounted to 290° C. (11/13) and 610° C. (8/10).

A gas from which hydrogen fluoride could be recovered became available in duct 15 at a rate of 16,750 m³/h and had the following composition in % by volume:

| | |
|---|---|
| $CO_2$ | 14.8 |
| $O_2$ | 2.1 |
| HF | 5.0 |
| $N_2$ | 58.0 |
| $H_2O$ | 20.1 |

When the solids fed via duct 16 were cooled in the fluidized bed cooler 17, air which had been indirectly heated and for this reason was free from dust became available in duct 18 at a rate of 3000 m³/h and directly heated air at a rate of 7000 m³/h became available in duct 21. These air streams were fed to the fluidizing bed reactor 1 as fluidizing air and secondary air, respectively.

The water-cooled chambers of the fluidized bed cooler were supplied with water of 40° C. at a rate of 67 m³/h, which was heated to 90° C. whereas the solids were cooled to 80° C. in said chambers.

We claim:

1. A method of producing hydrogen fluoride which comprises the steps of:
   (a) subjecting a fluorine-containing material to pyrohydrolysis in an expanded fluidized bed to produce a hot HF-containing gas and entraining material from said fluidized bed in said gas;
   (b) separating the material entrained in said hot HF-containing gas therefrom and recycling said material to said fluidized bed;
   (c) shock cooling the hot HF-containing gas by direct contact thereof with solids at a lower temperature than that of said hot HF-containing gas in a suspension-type heat exchanger whereby the gas is cooled for removal of HF therefrom and the solids are heated;
   (d) displacing the hot solids to a fluidized-bed cooler and cooling said solids with recovery of sensible heat therefrom; and
   (e) recycling at least part of the cooled solids from step (d) to step (c).

2. The method defined in claim 1 wherein the heated solids are cooled in step (d) by fluidizing same in a cooling gas and passing the solids through a plurality of cooling chambers, said cooling gas containing oxygen and being fed to the fluidized bed of step (a).

3. The method defined claim 1 or in claim 2, further comprising feeding oxygen-containing gas to the fluidized bed of step (a) in at least two streams on different levels.

* * * * *